Jan. 19, 1960

W. E. WIGHAM 2,921,767

WEIGHT ADJUSTER FOR SCALES

Filed May 27, 1953

INVENTOR.
W. E. WIGHAM

BY Hudson and Young

ATTORNEYS

Jan. 19, 1960 W. E. WIGHAM 2,921,767
WEIGHT ADJUSTER FOR SCALES
Filed May 27, 1953 4 Sheets-Sheet 3

INVENTOR.
W.E.WIGHAM
BY Hudson and Young
ATTORNEYS

Jan. 19, 1960

W. E. WIGHAM 2,921,767

WEIGHT ADJUSTER FOR SCALES

Filed May 27, 1953

INVENTOR.
W. E. WIGHAM

BY Hudson and Young

ATTORNEYS

United States Patent Office 2,921,767
Patented Jan. 19, 1960

2,921,767

WEIGHT ADJUSTER FOR SCALES

William E. Wigham, Borger, Tex., assignor to Phillips Petroleum Company, a corporation of Delaware Application May 27, 1953, Serial No. 357,868

6 Claims. (Cl. 249—14)

This invention relates to automatic scales. In one aspect it relates to an apparatus for facilitating the accurate adjustment of the automatic scale so as to increase or decrease the total weight by a controlled and predetermined amount. In another aspect this invention relates to an improved means for accurately weighing the component parts of a mixture composed of definite amounts of different materials and a method for quickly and accurately changing the quantity of any or all of these component parts. In a more specific aspect it relates to an apparatus for accurately changing the weight of carbon black slurry and rubber latex weighed on automatic scales and dumped into a mixing tank prior to coagulation of the carbon black loaded rubber.

In the manufacture of rubber, carbon black is added to the latex in definite, predetermined amounts and is thoroughly mixed with the latex prior to the coagulation step wherein the rubber crumbs are formed. In the manufacture of synthetic rubber, the monomers which form the rubber, for example butadiene and styrene, are polymerized in aqueous emulsion and after the unreacted butadiene and styrene are removed by steam stripping the latex is recovered and stored prior to the addition of the carbon black. The carbon black is dispersed in water, usually with the aid of a dispersing agent, and such carbon black slurry is stored prior to being incorporated into the rubber latex. The latex and carbon black slurry are weighed in predetermined amounts on separate automatic loading and dumping scales and the weighing hoppers of both scales are simultaneously dumped into a mixing tank when both hoppers have been filled with the required amounts of materials.

The amount of carbon black incorporated in a latex must be controlled within very close limits and when the nature of the carbon black slurry or the latex varies because of the changes in the total solids content, differences in the characteristics of the carbon black being used, errors in the determination of the total solids content of the latex or the carbon black slurry and changes in other variables, it is necessary to make adjustments in the amount of carbon black and latex weighed on the automatic scales in order to prevent the production of off-specification rubber. Even though it may be known that a definite increase in the amount of carbon black is required, for example an increase of 5 pounds of carbon black slurry per loading, it is difficult to make such adjustment in weight immediately since the scale must be adjusted usually over several loadings in order to arrive at the proper weight and during the time of such adjustments off-specification rubber may be produced. The feed to the dumping hopper on the scale platform is stopped by operation of a mercury-magnetic switch actuated by a magnet secured to the scale platform so that the switch is operated when the platform is moved downwardly. The weight adjustment is made by turning a knob on a threaded rod so as to raise or lower the mercury switch and thus to adjust its position with relation to the magnet.

Each of the following objects will be attained in at least one modification of this invention.

It is an object of this invention to provide an apparatus for quickly and accurately changing the amount of material weighed on an automatic scale by a predetermined amount.

It is another object to provide a means for accurately weighing the component parts which are to form a mixture and to change the ratio of these component parts by a predetermined amount.

It is still another object of this invention to provide a means for weighing the carbon black slurry and latex to form a mixture so that accurately controlled amounts of the carbon black slurry and the latex are simultaneously dumped from automatic scale hoppers.

It is still another object to provide an apparatus for simultaneously weighing accurately controlled amounts of carbon black slurry and latex on separate scales and simultaneously dumping these materials when the last hopper is filled.

Other objects and advantages will be apparent to one skilled in the art upon reading this disclosure and the attached drawing wherein.

In a typical synthetic rubber manufacture, eight or more scales will be used to weigh the carbon black slurry and latex which go to make up the carbon black loaded mixture. These weights will require changes at least two or three times per 8-hour shift as the carbon black slurry and latex feeds are changed from one storage tank to another. Additional adjustments are required whenever tests on the finished rubber indicate improper proportioning of the latex or carbon black slurry. It is necessary to make these weighing adjustments by turning a knob on the scale so as to either raise or lower the mercury-magnetic switch which completes an electrical circuit so as to stop the feed to the hopper. Since one turn of the knob will not cause a constant amount of change in weight, it normally requires 3 or 4 adjustments before the desired operation is obtained. With eight or more scales to adjust, this becomes a time consuming operation and results in considerable off-specification rubber being produced. In one plant, the off-specification rubber produced in one year because of improper carbon black loading was approximately 358,000 pounds. This off-specification rubber represents a loss of several thousand dollars.

I have invented an apparatus which, when attached to an automatic scale, will enable one to change the weighings by a predetermined amount quickly and accurately. The apparatus of my invention comprises a calibrated indicating device attached by a positive linkage to the rod which raises and lowers the mercury-magnetic switch so as to positively indicate the amount of change in the weighings. The device is advantageously calibrated in pounds although it can be calibrated in other units such as percent, etc.

Figure 1:
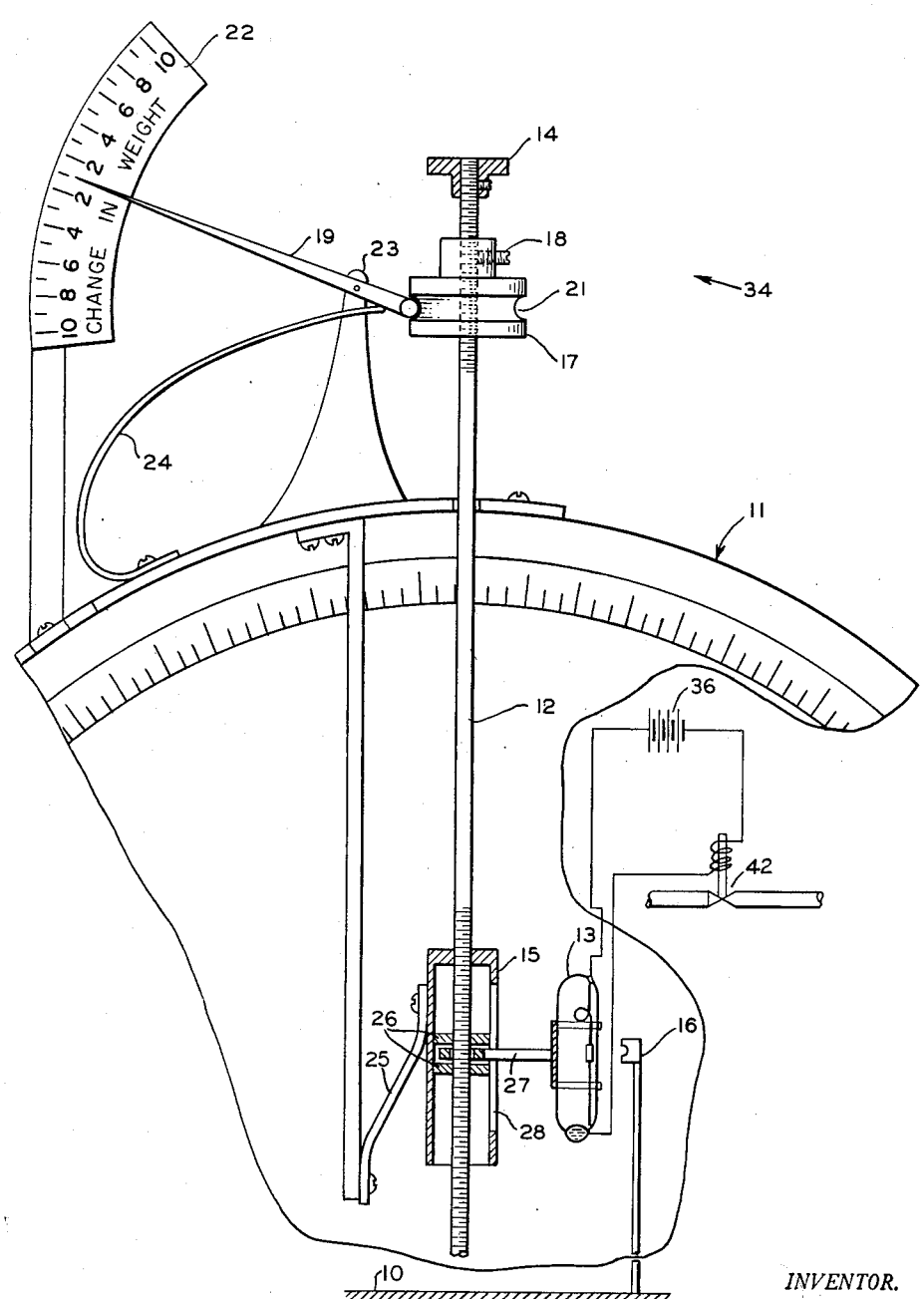
Figure 1 is a schematic drawing of the weight adjuster device.

The invention will now be explained with reference to the drawing. In Figure 1 the weight adjuster 34 is shown mounted upon the dial of an automatic scale 11. Threaded rod 12 raises or lowers the mercury-magnetic switch 13 by turning the knob 14 so as to cause rod 12 to travel through the threaded top of cylinder 15. Magnet 16 opens the mercury-magnetic switch when the platform 10 of the scale is in raised position and the hopper is being supplied. The magnet moves away from the switch when the platform is lowered by the hopper being filled to the required amount and allows the switch to close, completing the circuit through electrical source 36 and solenoid supply valve 42, and thus stop the flow of material to the hopper. Magnet 16 is shown with the platform 10 in the raised position and mercury switch 13 in the open position. Spool 17 is threaded so as to fit the threaded rod 12 and is secured from movement by the thumb screw 18. Pointer 19 fits in the slot 21 of spool 17 and indicates the amount of change in weight on the dial 22.

The pointer is hinged at 23 and the pointer is held against the upper side of slot 21 in spool 17 by the spring 24. The spring 24 prevents any slack in the mechanism so that the pointer responds to the slightest movement of knob 14. The instrument is initially adjusted by loosening thumb screw 18 and centering pointer 19 in dial 22 without turning rod 12 after which thumb screw 18 is again tightened.

Cylinder 15 is secured to the framework of the scale as indicated at 25. Bushings indicated at 26 are secured to rod 12 so as to allow arm 27 of switch 13 to travel vertically in slot 28 of cylinder 15 as the rod 12 is moved vertically through the threaded top of cylinder 15.

Figure 2:
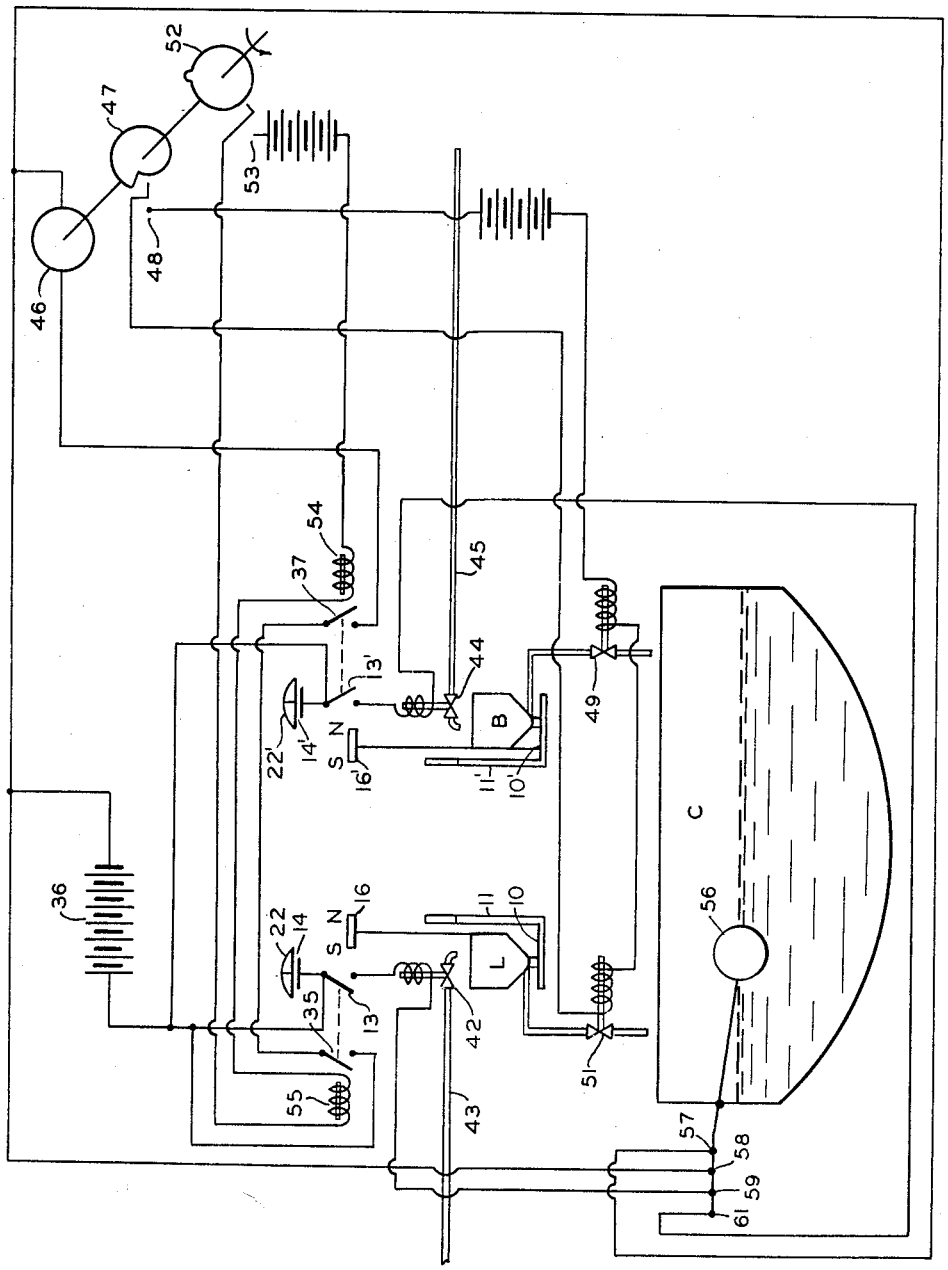
Figure 2 is a schematic drawing of a pair of automatic scales showing the wiring circuits.

In Figure 2 a latex weighing hopper is indicated at L and a carbon slurry weighing hopper is indicated at B and both the latex and carbon black hoppers dump into a mixing tank C. The latex scale is indicated at 11, the magnet 16 actuates the mercury-magnetic switch indicated at 13. The indicating weight adjuster of this invention which raises or lowers switch 13 is shown at 14. Switch 35 is mechanically connected to switch 13 by a linkage so that when one switch is actuated both switches are actuated. Switch 35 is connected to an electrical source indicated by battery 36 and to a switch 37 which is connected to a mercury-magnetic switch 13' of the carbon black slurry scale 11'. The carbon black scale 11' carries the magnet 16' which operates switch 13'. Scale 11' is regulated by an indicating weight adjuster 14' identical to that employed upon scale 11. The mercury-magnetic switch 13 of the latex scale 11 is connected to electrical source 36 and to a solenoid valve 42 on the latex feed line 43 to the latex hopper L. The solenoid valve 42 is adapted to be closed by closure of switch 13. The mercury-magnetic switch 13' is connected to electrical source 36 and to solenoid valve 44 in the carbon black slurry feed line 45. The solenoid valve 44 is adapted to be closed by closure of switch 13'.

Closure of both switches 35 and 37 completes an electrical circuit to motor 46 which operates a time cycle device so as to cause cam 47 to close switch 48 so as to complete a circuit opening solenoid valves 49 and 51. Thus when both hoppers L and B are filled, they are caused to dump simultaneously and since both switches 35 and 37 must be closed to start this time cycle both hoppers must be filled before the dumping operation can begin. Cam 52 on the time cycle device closes switch 53 which energizes solenoids 54 and 55 so as to reset switches 13, 35, 37, and 13' in open position after the hoppers are emptied and valves 49 and 51 are closed. Opening switches 13 and 13' opens valves 42 and 44 and the cycle is repeated.

In order to prevent the addition of more carbon black slurry and latex than the mixing tank C can hold, a liquid level control having a float 56 breaks contacts 57, 58, 59, and 61 when the level is above a predetermined point. The breaking of these contacts holds all of the circuits open and stops all operations except the dumping of hoppers L and B.

Figure 3:
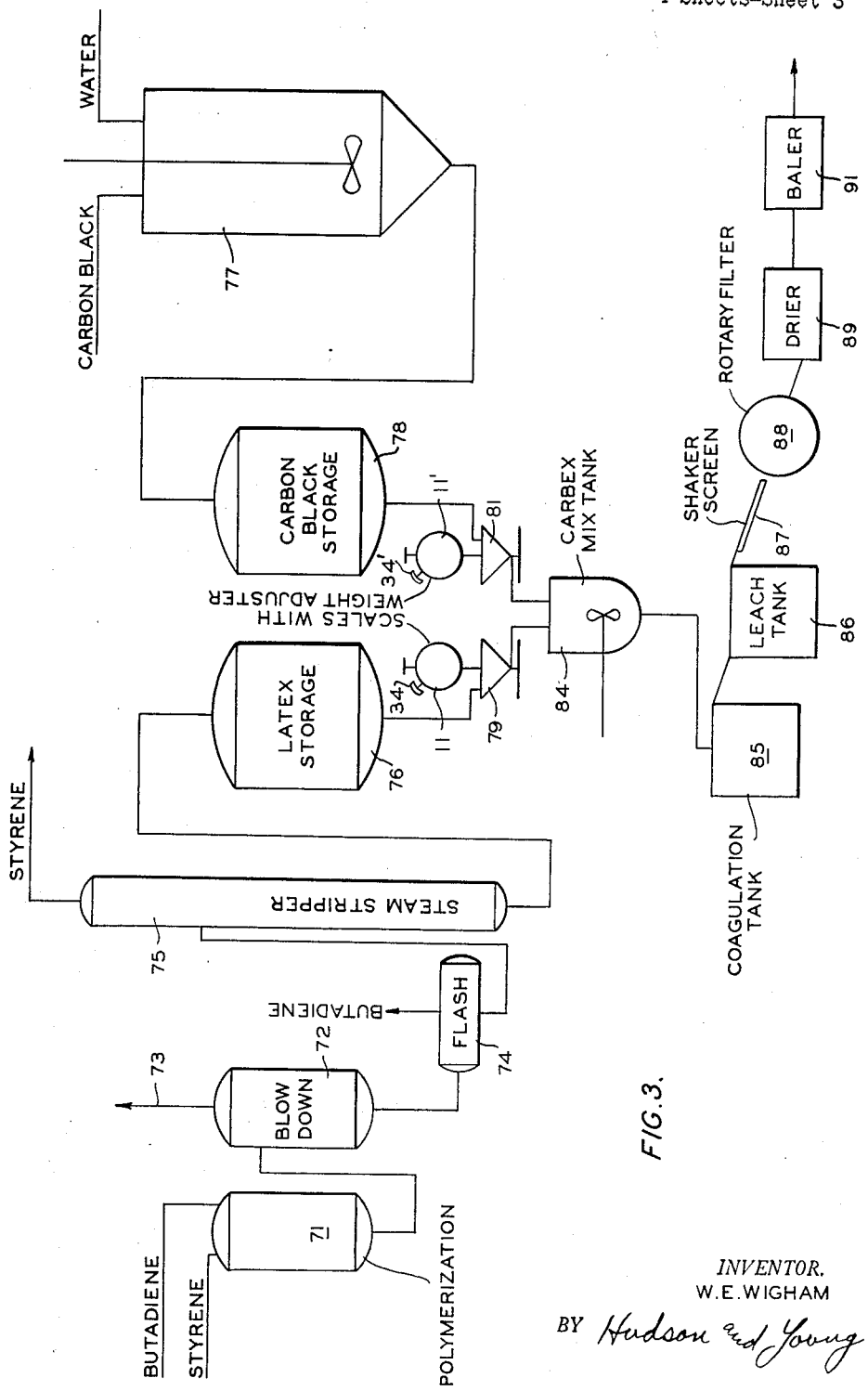
Figure 3 is a schematic flow sheet showing the steps of a synthetic rubber manufacturing process wherein this invention is employed.

Figure 3 is a schematic flow sheet of one process for the manufacture of synthetic rubber. In this process butadiene and styrene are polymerized in a polymerization zone 71, passed to a blow down zone 72 where some butadiene is recovered from vent 73, then to a flash zone 74 where the butadiene is flashed off as vapor, then to a steam stripping zone 75 where the styrene is removed as overhead product. The latex is recovered as bottom product from the steam stripping operation and is passed to storage tank 76. Carbon black is dispersed in water in a mixing zone 77 and a dispersing agent is usually added at this point (not shown). The carbon black slurry is then passed to storage tank 78. Latex and carbon black slurry are drawn from storage containers 76 and 78, weighed in the hoppers 79 and 81 of automatic scales 11 and 11', and the weighings of the two scales are simultaneously dumped from the hoppers into a mixing tank 84. The weight adjusters 34—34' of this invention are employed on these scales. In the mixing tank 84 the carbon black and latex are thoroughly mixed and then passed to a coagulation tank 85 where the rubber, loaded with carbon black is coagulated from the latex by the addition of acid, ammonium sulfate, or other coagulant. The coagulated rubber crumbs overflow from the coagulation tank 85 to a leach tank 86 where the crumbs are thoroughly washed with water. The crumbs overflow from the leach tank over a shaker screen 87 to a rotary vacuum filter 88 where the major portion of the water is removed, and then to a drier 89 for more complete removal of moisture, and then to a baler 91 where the crumbs are bound into bales as the product of the rubber manufacturing process.

Figure 4:
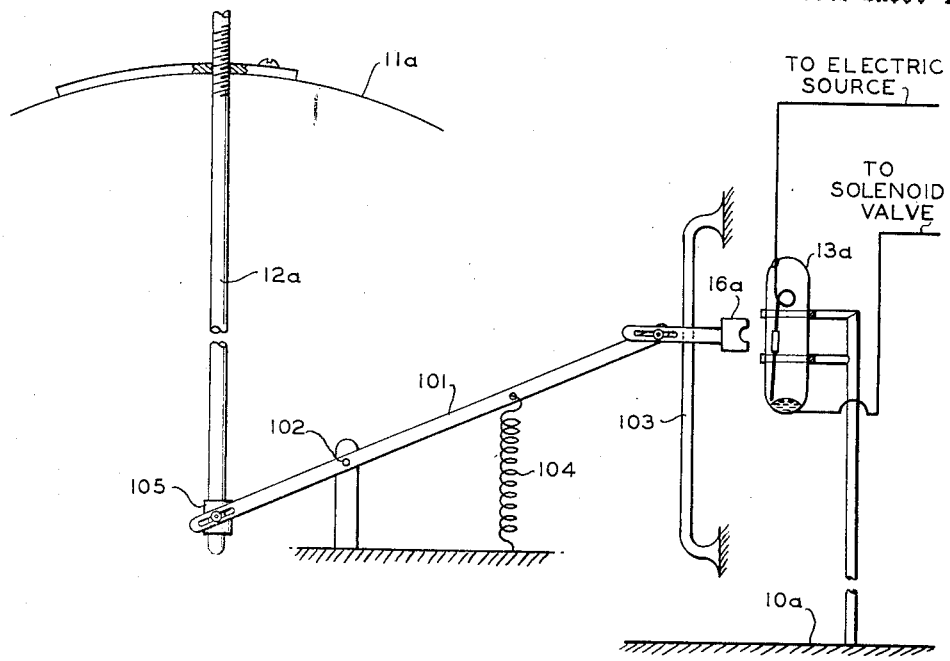
Figure 4 is a schematic representation of one modification of the weight adjuster device of Figure 1.

Figure 4 is a schematic representation of a modification of the weight adjuster device of Figure 1 and is shown mounted upon the dial of an automatic scale 11a. Rod 12a is threaded through the scale 11a and is operatively connected to magnet 16a by lever 101 pivoted at 102. Sleeve 105 is free to rotate upon rod 12a but is secured from vertical movement on rod 12a. Magnet 16a slides vertically on rod 103 and tension is maintained on the linkage by coil spring 104. In this embodiment the positions of the magnet 16a and the switch 13a have been reversed from that shown in Figure 1. Thus the magnet is maintained in a stationary position and the mercury switch is attached to the platform 10a. Adjustments in weighings are made by vertical displacement of the magnet.

Figure 5:
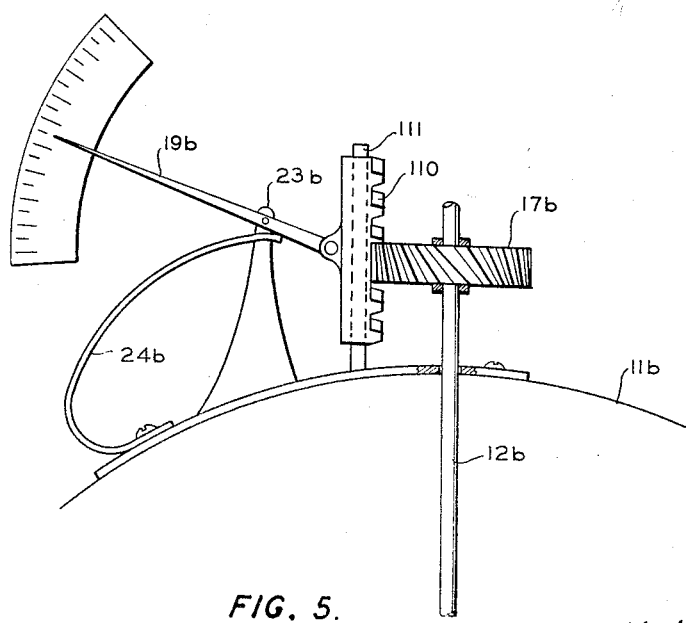
Figure 5 is a schematic representation of another modification of the weight adjuster device of Figure 1.

Figure 5 shows another means of actuating the pointer of the weight adjusting device. In this modification spool 17 of Figure 1 is replaced by gear wheel 17b which displaces rack 110 vertically on guide rod 111 so as to rotate pointer 19b about pivot 23b. Spring 24b maintains tension on rack 110 so as to eliminate slack or play.

The employment of the improved means for weighing carbon black slurry and latex of this invention has practically eliminated off-specification rubber resulting from improper carbon black loading. Furthermore, the time required for the operator to make the weight adjustment has been greatly minimized leaving more time for other duties which has resulted in a general improvement in operations. Additional advantages will be apparent to those skilled in the art from a consideration of this disclosure and the accompanying drawing.

Reasonable variations and modifications are possible within the scope of the disclosure of this invention, the essence of which is the provision of an apparatus for accurately predetermining the amount of change made in adjusting the weight on automatic scales and an improved means for operating automatic scales wherein the various components which form a predetermined mixture are accurately weighed and maintained in a definite proportion.

I claim:

1. In an automatic scale comprising a dial, a platform, means connecting said dial and said platform so as to indicate on said dial the weight of material supplied to said platform and a valved conduit means for supplying material to said platform wherein a mercury-magnetic switch stops the flow of material to the scale by completing a circuit between an electrical source and an electrically operated valve in said conduit means in response to the movement of a magnet actuated by the scale platform the improvement which comprises a threaded rod; a threaded bushing attached to said scale and engaging said threads of said rod; means operatively connecting said rod and said switch; a knob for turning said rod so as to adjust said switch vertically with respect to said magnet; a spool axially threaded on said rod and having means for rigidly securing said spool to said rod, said spool having a recessed portion; a pointer having a pivoted connection intermediate its ends and having one end adapted for sliding contact with the recessed portion of said spool; a calibrated second dial adjacent the free end of said pointer; and a spring operatively connected to said pointed so as to urge the pointer into contact with one side of said recess of said spool.

2. An apparatus for automatically weighing latex and carbon black slurry in accurate and predetermined amounts and simultaneously dumping said latex and said carbon black when both weighings are completed which comprises a first scale comprising a dial, a platform, and means connecting said dial and said platform so as to indicate on said dial the weight of material supplied to said platform; a latex hopper disposed upon said first scale platform and having a normally closed solenoid outlet valve; a latex feed tank; a latex feed line connected to said latex tank for supplying said latex hopper; a solenoid valve in said latex feed line; a second scale having a platform; a carbon black slurry hopper disposed upon said second scale platform and having a normally closed solenoid outlet valve; a carbon black slurry feed tank; a slurry feed line connected to said slurry tank for supplying said slurry hopper; a solenoid valve in said slurry feed line; a tank adapted so as to receive the contents of both said hoppers; a first magnet adapted to move in concert with the latex weighing platform; a second magnet adapted to move in concert with said carbon black weighing platform; a first mercury-magnetic switch operated by said first magnet when said latex hopper depresses the weighing platform; means for positively adjusting the weighing of said latex scale a predetermined amount by raising or lowering said first switch; means for indicating the vertical displacement of said first switch in terms of the weight of material supplied to the platform; a second mercury-magnetic switch operated by said second magnet when said carbon black hopper depresses the slurry weighing platform; means for positively adjusting the weighing of said carbon black scale a predetermined amount by raising or lowering said second switch; means for indicating the vertical displacement of said second switch in terms of the weight of material supplied to said platform; a first circuit adapted to close the solenoid valve in the latex feed line to the latex hopper when said first switch is closed; the second circuit adapted to close a solenoid valve in the carbon black slurry feed line to the carbon black slurry hopper when said second switch is closed; a third switch connected by a linkage to said first switch; a fourth switch connected by a linkage to said second switch; a third circuit containing a motor and completed by closing said third switch and said fourth switch; a first timing cam operated by said motor; a fourth circuit containing means for opening the outlet valves of said latex hopper and said carbon black hopper; a switch operated by said first cam so as to complete said fourth circuit for a predetermined time; a second timing cam operated by said motor; a fifth circuit containing means for reopening said first, second, third, and fourth switches after a predetermined time following the operation of said first cam; a switch operated by said second cam so as to complete said fifth circuit; and means for opening all of the circuits except said fourth circuit when the liquid level of the tank into which said hoppers are dumped is above a predetermined level.

3. In an automatic scale comprising a dial and a weighing platform supported upon a scale frame, a hopper positioned on said platform and means for connecting said dial and said platform to indicate on said dial the weight of materials supplied to said hopper, apparatus comprising a magnet rigidly attached to the weighing platform; a mercury-magnetic switch positioned on said scale so as to be operated by said magnet when the weighing platform is depressed a predetermined amount; means for vertically displacing said switch with respect to said magnet; means for indicating the amount of displacement of said switch in terms of the weight of materials supplied to said hopper; conduit means for supplying materials to said hopper; a loading valve positioned in said conduit means; and a circuit including a source of electrical energy operatively connected to said valve and to said switch so as to operate said valve upon closing of said switch.

4. In an automatic scale comprising a dial, a platform, means connecting said platform and said dial so as to indicate on said dial the weight of material supplied to said platform, and a valved conduit means for supplying material to said platform, the improvement which comprises a magnet rigidly attached to said platform; a vertical, threaded rod; a threaded bushing secured to said scale and threadably engaging said rod; a sleeve positioned around said rod; means for preventing vertical movement of said sleeve on said rod; means for preventing rotation of said sleeve; a mercury-magnetic switch secured to said sleeve in close proximity to said magnet and maintained in open position by said magnet when said platform is in raised position; means for rotating said rod; means for indicating the vertical displacement of said rod in terms of the weight of material supplied to said platform; and an electrical circuit, including means to close said valved conduit and including said mercury-magnetic switch, which is completed by closing said switch when the material supplied to said platform depresses said platform thereby removing said magnet from close proximity to said switch.

5. In an automatic scale comprising a dial, a platform, means connecting said dial and said platform so as to indicate on said dial the weight of material supplied to said platform, a conduit for supplying material to said platform, and a valve in said conduit, the improvement comprising a magnet rigidly attached to said platform; a vertical rod adapted for vertical displacement with reference to said magnet; a mercury-magnetic switch positioned so as to be maintained in open position by said magnet, operatively connected to said rod so as to be vertically displaced by said rod; means for closing said valve; an electrical circuit, including said switch and said means for closing said valve, which is completed by closing said switch when said platform is depressed so as to remove said magnet from proximity with said switch; a spool connected to said rod; a pointer operatively connected to said spool; resilient means urging said pointer in contact with said spool; and a second dial adjacent said pointer for indicating changes in the vertical position of said switch.

6. In an automatic scale comprising a dial and a weighing platform supported upon a scale frame, a hopper positioned on said platform and means for connecting said dial and said platform to indicate on said dial the weight of materials supplied to said hopper, apparatus comprising a mercury-magnetic switch rigidly attached to the weighing platform; a magnet positioned on said scale so as to operate said switch when the weighing platform is depressed a predetermined amount; means for vertically displacing said magnet with respect to said switch; means for indicating the amount of displacement of said magnet in terms of the weight of materials supplied to said hopper; conduit means for supplying materials to said hopper; a loading valve positioned in said conduit means; and a circuit including a source of electrical energy operatively connected to said valve and to said switch so as to operate said valve upon closing of said switch.

References Cited in the file of this patent

UNITED STATES PATENTS

| | | |
|---|---|---|
| 741,975 | Newman | Oct. 20, 1903 |
| 1,144,623 | Valois | June 29, 1915 |
| 1,516,387 | Kellerstedt | Nov. 18, 1924 |
| 1,715,838 | Hurt | June 4, 1929 |
| 1,987,122 | Michener | Jan. 8, 1935 |
| 2,037,688 | Brady | Apr. 14, 1936 |
| 2,303,163 | Hall | Nov. 24, 1942 |
| 2,322,278 | Buckwalter | June 22, 1943 |
| 2,341,251 | Walther | Feb. 8, 1944 |
| 2,343,000 | Carliss | Feb. 29, 1944 |
| 2,346,120 | Weckerly | Apr. 4, 1944 |
| 2,476,081 | Bugatti | July 12, 1949 |
| 2,559,307 | Martinson | July 3, 1951 |
| 2,638,305 | Miller | May 12, 1953 |
| 2,656,142 | Weckerly | Oct. 20, 1953 |
| 2,664,260 | Saxe | Dec. 29, 1953 |
| 2,679,374 | Mylting | May 25, 1954 |

FOREIGN PATENTS

| | | |
|---|---|---|
| 122,809 | Sweden | Nov. 13, 1944 |

UNITED STATES PATENT OFFICE

CERTIFICATE OF CORRECTION

Patent No. 2,921,767 January 19, 1960

William E. Wigham

It is hereby certified that error appears in the printed specification of the above numbered patent requiring correction and that the said Letters Patent should read as corrected below.

Column 5, line 14, for "pointed" read -- pointer --; line 53, for "the second" read -- a second --; line 54, for "a solenoid" read -- the solenoid --.

Signed and sealed this 16th day of August 1960.

(SEAL)
Attest:

KARL H. AXLINE
Attesting Officer

ROBERT C. WATSON
Commissioner of Patents